United States Patent [19]

Fifield

[11] Patent Number: 5,381,735
[45] Date of Patent: Jan. 17, 1995

[54] PROCESS FOR PRINTING USING A PHOTOPOLYMERIC MOLD MADE FROM PHOTOPOLYMERIZABLE COMPOSITIONS WITH IMPROVED RELEASE PROPERTIES

[75] Inventor: Charles C. Fifield, Landenberg, Pa.

[73] Assignee: Hercules Incorporated, Wilmington, Del.

[21] Appl. No.: 965,197

[22] Filed: Oct. 26, 1992

[30] Foreign Application Priority Data

Oct. 24, 1991 [GB] United Kingdom ............... 9122577

[51] Int. Cl.$^6$ ..................... B29C 33/40; C08K 5/10
[52] U.S. Cl. ............................ 101/483; 101/492; 101/493; 264/227; 264/300; 264/22; 106/38.2; 106/38.22; 106/38.24; 522/79; 522/96; 522/103; 522/107
[58] Field of Search ............ 101/483, 493, 492; 522/72, 96, 79, 103, 107, 154, 152; 264/227, 300; 427/510; 106/38.2, 38.22, 38.24

[56] References Cited

U.S. PATENT DOCUMENTS

| | | | |
|---|---|---|---|
| H444 | 3/1988 | Roth et al. | 264/300 |
| 2,760,863 | 8/1956 | Plambeck, Jr. | 95/5.6 |
| 3,989,609 | 11/1976 | Brack | 204/159.15 |
| 4,198,238 | 4/1980 | Scheve | 430/286 |
| 4,204,010 | 5/1980 | Kramm et al. | 522/96 |
| 4,218,294 | 8/1980 | Brack | 204/159.13 |
| 4,358,354 | 11/1982 | Iida et al. | 204/159.15 |
| 4,371,476 | 1/1983 | Newkirk et al. | 106/38.22 |
| 4,409,077 | 10/1983 | Sakiyama et al. | 522/79 |
| 4,442,302 | 4/1984 | Pohl | 204/159.23 |
| 4,473,403 | 9/1984 | Wesala | 106/38.24 |
| 4,500,442 | 2/1985 | Meyer | 252/182 |
| 4,640,938 | 2/1987 | Römer et al. | 522/79 |
| 4,749,750 | 7/1988 | Ansinger et al. | 525/190 |
| 4,837,126 | 6/1989 | Lin | 430/284 |
| 4,849,321 | 7/1989 | Hung et al. | 430/284 |
| 4,927,739 | 5/1990 | Taniguchi et al. | 522/79 |

*Primary Examiner*—Susan W. Berman
*Attorney, Agent, or Firm*—Mark D. Kuller; Martin F. Sloan; Bradley N. Ruben

[57] ABSTRACT

Release of a resin mold from a photopolymeric mold is enhanced by using an unsaturated fatty acid ester release agent in the photopolymeric composition. In addition to providing quick release of the resin mold, the incorporation of the unsaturated fatty acid ester improves the flexibility of the photopolymeric mold without sacrificing tensile strength or hardness. The resin mold is used to fabricate rubber plates for ink printing.

40 Claims, No Drawings

PROCESS FOR PRINTING USING A PHOTOPOLYMERIC MOLD MADE FROM PHOTOPOLYMERIZABLE COMPOSITIONS WITH IMPROVED RELEASE PROPERTIES

BACKGROUND OF THE INVENTION

1. The Field of the Invention

This invention relates to photopolymerizable compositions from which printing plates, or molds for making printing plates, are formed. This invention is particularly directed to printing plate molds having improved release characteristics.

2. The State of the Art

Photopolymerizable or photocurable polymers are used in the manufacture of printing plates. Such compositions typically contain monomers or "prepolymers" in which polymerization is initiated by light (actinic radiation). Polymerization can be initiated by using high energy radiation, such as in the ultraviolet frequencies, and the efficiency of the radiation is typically enhanced by the addition of a photoinitiator to the composition. The monomers or prepolymers include unsaturated bonds which participate in free radical polymerization upon exposure to actinic radiation, and thereby change the macroscopic structure of the composition from a fluid form to a solid form.

These photocurable resins can be used directly in the manufacture of printing plates. Typically, a liquid photocurable composition is cast onto a substrate, covered with a protective film, and selectively exposed to radiation in a desired pattern for reproduction; exposure is typically performed through a mask or transparency having opaque portions. Those portions of the composition exposed to actinic radiation polymerize and become insoluble to a solvent later used to wash away the unexposed portions. The entire plate is then exposed to radiation to assure that the composition over the entire surface of the plate is cured, which results in a printing plate devoid of tackiness. The result is a hardened photopolymer for use as a printing plate for imprinting the exposed pattern. The final plate is mounted onto a press; the relief portions of the printing plate pick up ink and so the plate can be used to make inked impressions.

U.S. Pat. No. 2,760,863 to Plambeck is related to such compositions. By the method in the Plambeck patent, printing plates are produced directly by exposing to actinic light, through an image bearing transparency, a layer of an essentially transparent photopolymerizable composition; this composition includes an addition polymerization initiator, and cross-links upon exposure to actinic radiation. The layer of photopolymerizable composition (suitably supported) is exposed until substantial polymerization of the composition occurs in the exposed areas; substantially no polymerization should occur in the unexposed, shaded areas. The unpolymerized material in the latter areas is then removed using a suitable solvent. The result is a raised relief image corresponding to the transparent areas in the transparency.

Compositions of the type described by Plambeck generally are prepared from polymeric compositions which require organic solvents for removal of the unexposed portions. Due to the toxicity, high volatility, and generally low flash point of low cost organic solvents, their use often gave rise to hazardous conditions. As a result, further research was directed towards the development of photopolymerizable compositions soluble in water or aqueous alkali. For example, U.S. Pat. Nos. 3,794,494 and 3,960,572, the disclosures of which are both incorporated herein by reference, describe water or aqueous alkali dispersible compositions which are suitable when polymerized for use as rigid or elastic flexographic printing plates. These patents describe the use of unsaturated polyesters or polyester-polyether urethane-linked block polymers containing acrylate or methacrylate end groups as the photopolymerizable composition. U.S. Pat. No. 4,198,238, the disclosure of which is incorporated herein by reference, describes aqueous-based photocurable compositions for fabricating soft printing plates suitable for printing with ultraviolet-curable inks; these compositions generally include a mixture of a polyether or polyester linked by a carbamoyl (urethane) to a terminal olefinic group in combination with a low molecular weight unsatured polyester and an ethylenically unsaturated monomer. Thus, a number of aqueous-based photocurable compositions are presently used; these systems allow the unexposed composition to be washed away with soap and water (i.e., water and suitable surfactants and/or detergents). The production of printing plates from a mixture of a photopolymerizable urethane prepolymer and an ethylenically unsaturated compound (such as vinylpyridine or acrylic acid) are described in U.S. Pat. No. 4,358,354, the disclosure of which is incorporated herein by reference. Further descriptions of photopolymer compositions for printing and other applications are contained in the following U.S. Pat. Nos. 3,989,609; 4,218,294; 4,218,299; 4,442,302; 4,837,126, and 4,849,321; the disclosures of which are all incorporated herein by reference.

The aforementioned U.S. Pat. No. 4,218,294 discloses photocurable coatings which, when used as a release coating or oxygen barrier, include the addition of a waxy material such as paraffin wax, ester wax (e.g., stearyl acetate, a saturated $C_{18}$ fatty acid ester), fluorocarbon wax, or a silicon-containing material in amounts of 0.1% to 1.0% by weight.

As previously mentioned, these composition may also be useful in the fabrication of molds from which several printing plates can be cast. In this application, the photocurable composition is used to make a positive mold, which is then used to make a negative mold, and the negative mold is used to make a rubber positive printing relief. Generally, these photopolymerizable compositions are the same as those wherein the photopolymer is used directly for printing. Printing plates are relatively softer to facilitate transfer of printing ink to the substrate; in contrast, molds are subject to heat and pressure, and so rigidity is required to prevent distortion of the mold image. Accordingly, the use of relatively harder prepolymers and monomers with more rigid (sterically hindered) side chains, and of a relatively greater amount of cross-linking agents, are some means for tailoring the composition to mold making.

U.S. Pat. No. 4,749,750 discloses lubricating or release compounds for poly(vinyl chloride) (PVC) plastics which comprise a polyester with a comblike structure; the polyester is obtained by condensing at least one $C_{12-14}$ hydroxy carboxylic acid with at least one monocarboxylic acid and/or glycerol chain terminator. These polyesters are described as providing superior lubrication properties in comparison with montan esters, i.e., esters from long-chain carboxylic acids with dihydric or polyhydric alcohols (e.g., glycol or glycerol). The release compounds are present in an amount of 0.3 to 3, preferably 0.5 to 1.0, parts by weight for each 100 parts of the PVC polymer. Montan wax is a hard, brittle mineral wax usually derived from lignites and is used especially for polishes, carbon paper, and insulating compositions.

SUMMARY OF THE INVENTION

One object of this invention to provide a photopolymerizable composition having improved mold release properties. Improved release properties are beneficial when such compositions are fabricated into molds for making rigid polymeric printing plate molds.

Another objective of the present invention is to avoid the problem of cracking and chipping of a photopolymeric mold by improving the release of a resin molded therein.

These benefits are provided by a photopolymerizable composition comprising a photopolymerizable material and an unsaturated fatty acid ester release agent. The photopolymerizable material typically comprises a photopolymerizable prepolymer selected from the group consisting of polyurethane, poly(vinyl alcohol), polyester, nylon, and unsaturated polyepoxide resins, and compatible mixtures thereof, and optionally further comprises a photopolymerizable addition monomer such an acrylate or methacrylate. The unsaturated fatty acid ester release agent is present in the photopolymerizable composition in amounts of at least about 0.1% by weight and not more than about 10% by weight.

This invention also provides a method for preparing a photopolymeric mold having improved release characteristics, which method comprises the steps of providing a photopolymerizable composition comprising a photopolymerizable material and an unsaturated fatty acid ester release agent, forming the composition into a photopolymerizable layer, exposing desired portions of the layer to actinic radiation effective to polymerize the exposed portions, and removing the unpolymerized portions of the composition to produce a photopolymeric mold. This invention thus provides a process for preparing a resin mold suitable for making printing plates by the steps of providing a photopolymeric mold having incorporated therein an unsaturated fatty acid ester release agent as just mentioned, filling the photopolymeric mold with a powdered resin adapted to be fused by heat and pressure to form a resin-filled mold, and subjecting the resin-filled mold to heat and pressure effective to fuse the resin and produce a resin mold suitable for making printing plates.

DETAILED DESCRIPTION OF THE INVENTION

The process of using a photopolymerizable composition for fabricating molds requires an appreciation for the release characteristics of the cured composition. It is most desirable for the hardened, photopolymeric mold to be reusable, to be suitable for the manufacture of a number of negative molds for subsequent fabrication of printing plates. In this respect, it is most important that the photopolymeric mold not crack or chip during the process of demolding the negative mold, otherwise any subsequent molds may transfer the defect to the final printing plate, resulting in a defective printing run. Likewise, the photopolymeric mold may be rendered unsuitable if the defect occurs in an area of the mold corresponding to a printed portion of the final article. Because the resin used to fabricate the negative mold is typically a rigid phenolic resin (similar to Bakelite ®) phenol-formaldehyde resins), the cured photopolymeric mold must be somewhat flexible to allow demolding of the rigid phenolic mold. However, flexing the photopolymeric mold during demolding stresses the mold structure and can facilitate tearing the mold. On the other hand, the photopolymeric mold must have sufficient hardness, strength, and stiffness to resist deformation during application of the heat and pressure required to mold the phenolic resin.

Thus, an important factor in avoiding degradation of the photopolymeric mold is the ease with which the photopolymer and the resin molded therein separate. The more easily this separation is effected, the less likely that the flexible photopolymeric mold will be damaged during the demolding process. In addition, productivity is facilitated when the printing plate can be quickly released from the mold without damage. This need is provided via the present invention by the incorporation of an unsaturated fatty acid ester in the photopolymerizable composition to facilitate the separation of the photopolymeric mold and the resin molded therein. It also has been discovered that this addition to the composition improves the flexibility of the photopolymeric mold without sacrificing tensile strength or hardness.

As mentioned above, the photopolymerizable composition comprises a photopolymerizable material having ethylenically unsaturated bonds available for participation in addition (free radical) polymerization. Prepolymers, such as those in the various patents mentioned before, all of which are incorporated herein by reference, include a relatively low molecular weight polymer or oligomer having olefinic bonds at the termini of the chain; they are referred to as "prepolymers" since they are subsequently further polymerized by use of actinic radiation. The body of such a prepolymer typically contains blocks of urethane (carbamoyl), ether, and/or ester units. Exemplary prepolymers can be derived from among polyurethane, poly(vinyl alcohol), polyester, nylon, and unsaturated polyepoxide resins, and compatible mixtures thereof, with a polyurethane prepolymer preferably being present in the composition. The termini of the prepolymer chain are typically "capped" via an ester or carbamoyl (urethane) linkage with an olefinic moiety such as an acrylate or methacrylate. Thus, photopolymerizable materials as described in the aforementioned U.S. Pat. No. 4,198,238, liquid (pre)polymers containing at least two terminal olefinically unsaturated groups linked by a urethane linkage to polyether, polyester (saturated or unsaturated), block polyesterpolyether polymers, or other hydroxy terminated polymers, having a number average molecular weight of about 5,000–26,000 and a room temperature viscosity of about 100,000–300,000, are suitable in this invention. Likewise, photopolymerizable materials as described in the aforementioned U.S. Pat. No. 4,358,354, comprising (a) at least one urethane prepolymer having in the middle of the molecule at least two polyol compound monomer units linked through a diisocyanate compound monomer unit, and having only in the termini of the molecule a carboxyl group and an acrylic residue having a vinyl group, (b) at least one ethylenically unsaturated compound, and (c) a photoinitiator, may be used. Materials such as described in the aforementioned U.S. Pat. Nos. 4,218,294 and 4,442,302 are also suitable for use in this invention.

The photopolymerizable material may comprise an addition monomer in place of or in combination with the photopolymerizable prepolymer (such combinations are described, for example, in the aforementioned U.S. Pat. No. 4,358,354). Suitable addition monomers typically include: unsaturated compounds such as acrylic and methacrylic acid and the various esters thereof; derivatives thereof such as acrylamide and methacrylamide; aromatic vinyl compounds such as styrene and divinyl benzene; allyl compounds such as diallyl phthalate and triallyl cyanurate; vinyl acetate; acrylonitrile; itaconic acid; fumaric acid; unsaturated polyester, alkyd, or urethane resins (weight average molecular weight up to about 3000); and the like, and compatible mixtures thereof. Especially preferred in the present invention are trimethyl propane trimethacrylate and isobornyl methacrylate in combination; tetrahydrofuranmethacrylate may be used in place of all or part of the isobornyl methacrylate. The addition monomer is preferably present in combination with the prepolymer in the range of about 10% to about 50% by weight of the composition, and more preferably falls within the range of about 20–30 wt. % of the photopolymerizable composition.

As the release agent, this invention has identified a novel class of compounds, namely unsaturated fatty acid esters. In general, these compounds are fatty acids having at least eight carbon atoms, more typically about 12 to about 24 carbon atoms, which have been esterified; they may be esterified, for example, with a short chain ($C_{1-6}$) alcohol (mono- or polyhydric). Either or both of the fatty acid and the alcohol may be straight chain or branched, or may be substituted with moieties chemically compatible with the other substituents of the photopolymerizable composition. The fatty acid may be mono- or polyunsaturated, or a combination thereof (e.g., if esterified with a polyhydric alcohol). Exemplary unsaturated fatty acids include oleic, linoleic, and linolenic acids (respectively octodec-9-enoic, octodec-9,12-enoic, and octodec-9,12,15-enoic acids). Preferred fatty acids are those containing about 16 to about 20 carbons. Fatty acids are conventionally esterified with short chain alcohols having not more than about six carbon atoms, and more typically about three carbon atoms, such as glycol and glycerol. A preferred fatty acid ester is commercially available as Loxiol ® G71S, described as a complex ester from unsaturated fatty acids, and is available from Henkel Plastic Additives, Ambler, PA; it is sold as a liquid external lubricant for PVC processing.

The unsaturated fatty acid esters useful in the present invention generally will have an iodine value between about 40 and about 120, more preferably between about 50 and about 100, and most preferably will have an iodine value between about 60 and about 65. The iodine value is a measure of the degree of unsaturation in a fat or vegetable oil and is defined as the percentage of iodine by weight absorbed by the sample in a given time under standard conditions. (This test may be used to distinguish fats from different sources, for example, iodine values of 69–72 for corn-fed hogs versus values of 90–100 for peanut-fed hogs.) Iodine bromide is often the reagent used because of its reactivity, but results for double or triple bond addition are calculated in terms of iodine for the unsaturated esters. The iodine value of the Loxiol ® G71S complex ester is about 63.

In the use of the present photopolymerizable compositions to fabricate molds, the unsaturated fatty acid ester release agent is present in an amount of between about 0.1% and about 10.0% by weight, more preferably at least about 1% and not more than about 6%; most advantageously, for a wide latitude in processing, an amount of at least about 1.5% and not more than about 2.5% is employed.

The present compositions may also include compatible photoinitiators, such as benzoins, anthraquinones, acetophenones, and disulfides, as described in the aforementioned U.S. Pat. No. 4,198,238. Also as described therein, to inhibit premature cross-linking and provide a more stable product, a thermal polymerization inhibitor may be added to the composition; various cresols, quinones, and hydroquinones are suitable stabilizers in this regard.

In the manufacture of a photopolymeric mold, the photopolymerizable composition comprising the photopolymerizable material and the release agent (along with any photoinitiator and stabilizer) are first formed into a photopolymerizable layer or sheet by such methods as casting, injecting, and extruding. Typically, the photopolymerizable composition is cast onto a transparent support base to form the photopolymerizable layer. The cast layer is then image-wise exposed through a positive-generating mask and the unexposed composition is washed away. Washing will normally be accomplished with a dilute aqueous solution of an anionic or nonionic detergent, as described for the photopolymerizable compositions of the aforementioned U.S. Pat. No. 4,198,238, or dilute sodium carbonate for the photopolymerizable compositions described in the aforementioned U.S. Pat. No. 4,358,354. Thereafter, the entire plate is exposed for final curing of the composition with the result being a photopolymeric mold.

The cured photopolymeric mold is then used to make a negative mold typically comprised of a rigid phenolic resin. The photopolymeric mold is filled with a phenolic resin powder and packed in with the use of phenolic backing sheet. Heat and pressure are applied to fuse the resin powder and produce a phenolic resin mold (a negative mold). This negative resin mold is then used to form a rubber sheet having a positive image, which is subsequently used to form inked impressions on a substrate.

As noted previously, photopolymerized compositions are useful directly as printing plates or as molds for making printing plates. There are a number of advantages for using photocurable compositions as molds in the fabrication of printing plates. Photocurable compositions are costlier than both the phenolic resin molded in the photopolymeric mold and the rubber composition molded in the phenolic mold. On the other hand, rubber compositions are more suitable than photopolymeric compositions for printing plates used with solvent-based inks because of their decreased tendency to swell (solvent swelling of the printing plate will distort the image and reduce image quality). Photocurable compositions are designed with direction towards controlling their photocurable characteristics; typically, these relate to the rate of curing, lack of shrinkage or distortion upon curing, and the resolution achieved upon exposure. Modification of the composition to vary properties necessary for other operations, such as printing, may compromise those optimal and desirable for exposure or molding.

The following Examples illustrate the practice of the invention and are not intended to limit the invention to only those compositions and conditions described.

EXAMPLE 1

A prepolymer identified as HVLPA was prepared according to the procedure described by Example 1 of U.S. Pat. No. 4,358,354.

The following ingredients in the approximate amounts shown below were then admixed to prepare a photopolymerizable composition:

| | | |
|---|---|---|
| HVLPA | Acrylic-capped urethane prepolymer | 73.1% |
| TMPTMA | Trimethyl propane trimethacrylate | 18.5 |
| IBOMA | Isobornyl methacrylate | 5.9 |
| DMPAP | 2-2-Dimethoxy-2-phenylacetophenone | 0.29 |
| BHT | Butylated hydroxytoluene | 0.05 |
| TPP | Triphenyl phosphite | 0.20 |
| G71S | Loxiol ® brand complex fatty acid ester | 1.96 |
| | | 100.00 |

The DMPAP was added as the photoinitiator, and BHT and TPP were added as stabilizers. IBOMA was chosen because of the relative inflexibility of the bornyl ring structure, thereby increasing the hardness and tensile strength of the resulting photopolymer; this is in contrast to such monomers as lauryl methacrylate, used in photopolymeric direct printing plates as an internal plasticizer. Another monomer similarly preferred for increasing hardness and tensile strength is tetrahydrofuran methacrylate.

The composition was cast onto a substrate and exposed through a phototool to polymerize the desired portions imaged. The unexposed material was removed by washing to produce a photopolymeric mold.

Powdered phenolic resin (available as 80 mesh phenolic molding powder from Econo Products, Rochester, N.Y.) was poured in to fill the mold, a phenolic backing board was placed on the filled mold to pack the resin, and heat and pressure were applied to fuse the powdered resin to itself and the backing board, thereby producing a resin mold.

This resin mold was then rapidly demolded from the photopolymeric mold. For at least six photopolymeric molds made with this composition, the resin mold literally fell apart from or popped out of the photopolymeric mold; additionally, there was no chipping or cracking of the photopolymeric mold.

A printing plate was produced from the resin mold by filling the mold with a thermally curable rubber material (such as natural or nitrile rubber with a thermal initiator) and subjecting the mold to heat and pressure to fuse the rubber powder. The rubber printing plate was then demolded and mounted in a printing machine.

This example illustrates how incorporation of the unsaturated fatty acid ester into the photopolymerizable composition facilitates demolding of the cured polymer without damaging either the positive or negative mold during the separation.

EXAMPLE 2

The procedure described in Example 1 was repeated with the exception that different release agents were substituted for the unsaturated fatty acid ester of the present invention. One comparative composition included EBECRYL 350, a silicon ester acrylate oligomer used for improving slip, wetting, flow, and release properties, and available from Radcure Specialties, Inc., Louisville, Ky. Another comparative composition included MOLD WIZ 1988A, described by the manufacturer as a proprietary high polymeric condensation product of synthetic resins, glycerides, and organic acid derivatives with copolymers of organic phosphate esters in an intimate admixture with "otherwise modified" fatty acids. Yet another comparative composition included MOLD WIZ 2191, described by the manufacturer as a proprietary complex amine based mixture in an intimate combination with oleo chemical derivatives. Both of the MOLD WIZ products are sold as internal release (lubricant) and anti static agents for various polyurethanes, and are available from Axel Plastics Research Laboratory, Inc., Woodside, N.Y.

No improvement in release properties was obtained using 2 wt. % of these release agents in comparison with the novel additive of this invention. Rather, use of each of the aforementioned release agents resulted in resin molds that could not be separated without tearing or chipping of the photopolymeric mold.

Generally, manufacturers are able to produce about three phenolic resin molds from each photopolymeric mold before the photopolymeric mold tears or is otherwise made unusable. By use of the present invention it is expected that six or more resin molds can be made before the photopolymeric mold is no longer suitable for further molding.

The foregoing descriptions and examples are meant to illustrate and explicate the invention. Upon perusing this specification, the artisan may contrive various modifications, and such changes are intended to be within the scope and spirit of the invention as defined by the claims.

What is claimed is:

1. A process for printing an image on a substrate, comprising:
   A) providing a photopolymerizable composition comprising photopolymerizable prepolymers, ethylenically unsaturated addition monomers and a release agent prepared by esterification of a 8 to 24 carbon atom unsaturated fatty acid with a $C_{1-6}$ alcohol;
   B) forming the photopolymerizable composition into a photopolymerizable layer;
   C) exposing desired portions of the photopolymerizable layer to actinic radiation effective to polymerize the exposed portions;
   D) removing the unpolymerized portions of the photopolymerizable layer to produce a photopolymeric mold;
   E) filling the photopolymeric mold with a powdered resin adapted to be fused by heat and pressure to form a resin-filled mold;
   F) subjecting the resin-filled mold to heat and pressure effective to fuse the resin and produce a resin mold suitable for making printing plates;
   G) filling the resin mold with powdered rubber;
   H) subjecting the powdered rubber filled resin mold to sufficient heat and pressure to fuse the rubber powder, and produce a rubber printing plate;
   I) providing a substrate to be printed;
   J) applying ink to the printing plate; and
   K) pressing the printing plate against the substrate to form an inked image thereon.

2. The process of claim 1 wherein the alcohol is a $C_3$ alcohol.

3. The process of claim 2 wherein the fatty acid is selected from the group consisting of oleic, linoleic and linolenic acids.

4. The process of claim 1 wherein the photopolymerizable composition comprises a photopolymerizable prepolymer selected from the group consisting of polyurethane, poly(vinyl alcohol), polyester, nylon and unsaturated polyepoxide resins, and compatible mixtures thereof.

5. The process of claim 4 wherein the photopolymerizable composition further comprises an addition monomer.

6. The process of claim 1 wherein the photopolymerizable composition comprises a photopolymerizable polyurethane prepolymer and an addition monomer.

7. The process of claim 6 wherein the addition monomer is selected from the group consisting of isobornyl methacrylate, tetrahydrofuran methacrylate, and trimethylolpropane trimethacrylate, and compatible mixtures thereof.

8. The process of claim 7 wherein the release agent is derived from a fatty acid having 8 to 24 carbons.

9. The process of claim 8 wherein the release agent is derived from a fatty acid having 12 to 24 carbons.

10. The process of claim 9 wherein the release agent is present in the composition in an amount of from about 0.1% by weight to about 10% by weight.

11. The process of claim 10 wherein the release agent is derived from a fatty acid having 16 to 20 carbons.

12. The process of claim 11 wherein the release agent is present in an amount of not more than about 6% by weight.

13. The process of claim 12 wherein the release agent is present in an amount of at least 1% by weight.

14. The process of claim 13 wherein the release agent has an iodine value between about 40 and about 120.

15. The process of claim 14 wherein the release agent has an iodine value between about 50 and about 100.

16. The process of claim 15 wherein the release agent is present in an amount of at least 1.5% and not more than about 2.5% by weight.

17. The composition of claim 16 wherein the release agent has an iodine value between about 60 and about 65.

18. A method for preparing a photopolymeric mold having improved release characteristics, comprising the steps of:
A. providing a photopolymerizable composition comprising a photopolymerizable material and a release agent prepared by esterification of an unsaturated fatty acid having 8–24 carbon atoms and a $C_{1-6}$ alcohol;
B. forming the photopolymerizable composition into a photopolymerizable layer;
C. exposing desired portions of the photopolymerizable layer to actinic radiation effective to polymerize the exposed portions; and
D. removing the unpolymerized portions of the composition to produce a photopolymeric mold.

19. A process for preparing a resin mold suitable for making printing plates, comprising the steps of:
A. providing a photopolymeric mold by the process as defined by claim 18;
B. filling the photopolymeric mold with a powdered resin adapted to be fused by heat and pressure to form a resin-filled mold; and
C. subjecting the resin-filled mold to heat and pressure effective to fuse the resin and produce a resin mold suitable for making printing plates.

20. A process for making a printing plate, comprising providing a resin mold according to the process of claim 19 and molding a powdered rubber composition therein to produce a rubber printing plate.

21. A process as claimed in claim 18, wherein the photopolymerizable material comprises a photopolymerizable prepolymer selected from the group consisting of polyurethane, poly(vinyl alcohol), polyester, nylon, and unsaturated polyepoxide resins, and compatible mixtures thereof.

22. A process as claimed in claim 21, wherein the photopolymerizable material further comprises an addition monomer.

23. A process as claimed in claim 18, wherein the release agent is derived from a fatty acid having 12 to 24 carbon atoms.

24. A process as claimed in claim 23, wherein the release agent is present in the composition in an amount of from about 0.1% by weight to about 10% by weight.

25. A process as claimed in claim 18, wherein the photopolymerizable material comprises a photopolymerizable polyurethane prepolymer, and wherein the photopolymerizable material further comprises an addition monomer.

26. A process as claimed in claim 25, wherein the addition monomer is selected from the group consisting of isobornyl methacrylate, tetrahydrofuran methacrylate, and trimethyl propane trimethacrylate, and compatible mixtures thereof.

27. A process as claimed in claim 25, wherein the release agent is derived from a fatty acid containing from 12 to 24 carbon atoms, and is present in the composition an amount of from about 0.1% by weight to about 10% by weight.

28. A process as claimed in claim 27, wherein the release agent is derived from a fatty acid containing 16 to 20 carbon atoms.

29. A process as claimed in claim 27, wherein the release agent is present in an amount of not more than about 6% by weight.

30. A process as claimed in claim 19, wherein the release agent is present in an amount of at least about 1% by weight.

31. A process as claimed in claim 27, wherein the release agent is present in an amount of at least about 1% and not more than about 6% by weight, and wherein the release agent has an iodine value between about 40 and about 120.

32. A process as claimed in claim 31, wherein the release agent has an iodine value between about 50 and about 100.

33. A process as claimed in claim 32, wherein the release agent is present in an amount of at least about 1.5% and not more than about 2.5% by weight.

34. A process as claimed in claim 33, wherein the release agent has an iodine value between about 60 and about 65.

35. The process defined by claim 18, wherein the release agent has an iodine value between about 40 and about 120, and wherein the photopolymerizable composition comprises a photopolymerizable polyurethane prepolymer and an addition monomer.

36. The process defined by claim 35, wherein the release agent is present in an amount of at least about 0.1% by weight and not more than about 10% by weight.

37. The process defined by claim 36, wherein the release agent is present in an amount of at least about 1% by weight and not more than about 6% by weight.

38. The process defined by claim 37, wherein the release agent has an iodine value between about 50 and about 100.

39. The process defined by claim 38, wherein the release agent is present in an amount of at least about 1.5% by weight and not more than about 2.5% by weight.

40. The process defined by claim 39, wherein the release agent has an iodine value of between about 60 and about 65.

* * * * *

UNITED STATES PATENT AND TRADEMARK OFFICE
CERTIFICATE OF CORRECTION

PATENT NO. : 5,381,735
DATED : January 17, 1995
INVENTOR(S) : Charles C. Fifield (Case 1)

It is certified that error appears in the above-indentified patent and that said Letters Patent is hereby corrected as shown below:

In the Claims, Col. 10, claim 30, line 37, "claim 19" should read --claim 29--.

Signed and Sealed this

Eleventh Day of April, 1995

Attest:

BRUCE LEHMAN

Attesting Officer         Commissioner of Patents and Trademarks